(12) United States Patent
Skoglund et al.

(10) Patent No.: US 8,333,922 B2
(45) Date of Patent: Dec. 18, 2012

(54) METHOD OF PRODUCING OBJECTS CONTAINING NANO METAL OR COMPOSITE METAL

(75) Inventors: Peter Skoglund, Huddinge (SE); Abraham Langlet, Stockholm (SE)

(73) Assignee: Exmet AB, Nacka (SE)

( * ) Notice: Subject to any disclaimer, the term of this patent is extended or adjusted under 35 U.S.C. 154(b) by 91 days.

(21) Appl. No.: 12/737,985

(22) PCT Filed: Aug. 31, 2009

(86) PCT No.: PCT/SE2009/050980
§ 371 (c)(1),
(2), (4) Date: Mar. 16, 2011

(87) PCT Pub. No.: WO2010/027317
PCT Pub. Date: Mar. 11, 2010

(65) Prior Publication Data
US 2011/0165339 A1    Jul. 7, 2011

(30) Foreign Application Priority Data
Sep. 5, 2008 (SE) .................................... 0801909

(51) Int. Cl.
*B22F 3/105* (2006.01)
*C22C 45/00* (2006.01)

(52) U.S. Cl. ............... 419/7; 148/513; 148/561; 419/5; 419/6; 419/23; 419/25; 427/556

(58) Field of Classification Search ............. 148/403, 148/513, 561; 219/76.1–76.17, 121.11–121.86; 419/5–7, 23, 25, 61; 427/398.1–398.5, 532, 427/553–556, 597
See application file for complete search history.

(56) References Cited

U.S. PATENT DOCUMENTS 4,863,538 A    9/1989  Deckard ................. 156/62.2

(Continued)

FOREIGN PATENT DOCUMENTS

KR    20050080566    8/2005

(Continued)

OTHER PUBLICATIONS

Inoue et al: "Synthesis of High Strength Bulk Nanocrystalline Alloys Containing Remaining Amorphous Phase", J. of Metastable and Nano-crystalline Materials, vol. 1 (1999), pp. 1-8.

(Continued)

*Primary Examiner* — Stanley Silverman
*Assistant Examiner* — Brian Walck
(74) *Attorney, Agent, or Firm* — Jacobson Holman PLLC

(57) ABSTRACT

A method of producing three-dimensional bodies which wholly or for selected parts consists of a composite of crystalline or nanocrystalline metal particles in a matrix of amorphous metal. A metal powder layer (4) is applied onto a heat-conducting base (1, 13) and limited areas of the layer is melted successively by means of a radiation gun and cooled so that they can be made to solidify into amorphous metal. In connection with the melting of one or several of the limited areas, the radiation gun is regulated so that the melted area is cooled in accordance with a stipulated time-temperature curve in order to form a composite of crystalline or nanocrystalline metal particles in a matrix of amorphous metal. The method is repeated until a continuous layer, which contains composite metal to a desired extent, is formed. A new powder layer (4) is applied and the method is repeated, the new layer being fused to the underlying layer for successive construction of the three-dimensional body. Alternatively, a layer of only amorphous metal is produced at first, whereupon limited areas of the layer is heated by means of the radiation gun and heat-treated in accordance with the stipulated time-temperature curve in order to transform the amorphous metal into a composite of crystalline or nanocrystalline metal particles in a matrix of amorphous metal.

8 Claims, 3 Drawing Sheets

U.S. PATENT DOCUMENTS

| | | | | |
|---|---|---|---|---|
| 5,740,854 | A | 4/1998 | Inoue et al. | 164/495 |
| 5,837,960 | A | 11/1998 | Lewis et al. | 219/121.63 |
| 7,244,321 | B2 | 7/2007 | Kim et al. | 148/561 |
| 2002/0041818 | A1* | 4/2002 | Abe et al. | 419/7 |
| 2006/0157454 | A1* | 7/2006 | Larsson | 219/121.8 |
| 2006/0165546 | A1* | 7/2006 | Yamada et al. | 419/6 |

FOREIGN PATENT DOCUMENTS

| | | |
|---|---|---|
| WO | 2004056509 | 7/2004 |
| WO | 2008039134 | 4/2008 |

OTHER PUBLICATIONS

Y. Yokohama et al: "Electron-beam welding of Zr50Cu30Ni10Al10 bulk glassy alloys", Materials Science and Engineering A 375-377 (2004), pp. 422-426.

Y. Kawamura: "Liquid phase and supercooled liquid phase welding of bulk metallic glasses", Materials Science and Engineering A 375-377 (2004), pp. 112-119.

S. Kagao et al.: "Electron beam welding of Zr-based bulk metallic glasses", Materials Science Engineering A 375-377 (2004), pp. 312-316.

Y. Kawamura et al: Materials Transactions, vol. 42, No. 12 (2001), pp. 2649-2651.

Leslie K. Kohler et al: "Spray forming Iron Based Amorphous Metals", Documemt NSWCCD-61-TR-2003/09 from Naval Surface Warfare Center.

S.J. Poon et al: "Glass formability of ferrous- and aluminum-based structural metallic alloys", Journal of Non-Crystalline Solids, vol. 317, No. 1, Mar. 2003, pp. 1-9.

Stability and Icosahedral Transformation of Supercooled Liquid in Metal-Metal type Bulk Glassy Alloys 2003, 2003 MRS Fall Meeting; Boston, MA, USA.

* cited by examiner

METHOD OF PRODUCING OBJECTS CONTAINING NANO METAL OR COMPOSITE METAL

This is a national stage of PCT/SE09/050980 filed Aug. 31, 2009 and published in English, which claims the priority of Swedish number 0801909-3 filed Sep. 5, 2008, hereby incorporated by reference.

BACKGROUND OF THE INVENTION

1. Field of the Invention

The invention relates to a method of producing three-dimensional bodies of metal which wholly or for selected parts consist of a composite of crystalline or nanocrystalline metal particles in a matrix of amorphous metal.

2. Description of the Related Art

When cooling a metallic material from melt to solid phase, a polycrystalline structure is usually obtained. Here, the microstructure consists of a large number of different grains where the atoms in each grain are arranged according to some kind of regular pattern. If the atoms instead are completely disordered and there are no grains with regularly positioned atoms, the material is said to be amorphous. This can for example be achieved by cooling a melt very rapidly so that there is no time for any grains to grow, or by very extensive mechanical deformation where the grains are disrupted.

At the beginning of the sixties, the first amorphous metals were produced by spraying a thin layer of melt onto a heat-conducting base. This resulted in very high cooling speeds of $10^5$-$10^6$ K/s and there was no time for any grains to grow so the disordered structure was maintained also in the solid phase. However, the resulting alloys were very thin with a thickness of only some tens of micrometers and therefore had limited ranges of application.

Amorphous bulk metals or amorphous structural metals, i.e. amorphous metals with dimensions that permitted structural applications, were not produced until the seventies from specially composed alloys. Bulk metals of these alloys were produced by cooling from melt at a cooling speed of about 1000 K/s, but contained i.e. the expensive metal palladium, which prevented larger volumes of production. At the end of the eighties, Professor Inoue at the Tohoku University in Japan managed to develop various multi-component systems consisting of ordinary metallic elements which resulted in an amorphous bulk structure when cooling from melt. In the years that followed, a great number of different amorphous metal systems have been found. In the literature, these are often denominated "Bulk Metallic Glasses".

Completely amorphous materials often have a very high hardness, whereas polycrystalline materials are more ductile. In many situations, there is a desire to combine properties of materials with amorphous structure and crystalline structure, respectively. In a polycrystalline structure, the area between the crystals, the grain boundaries, can be regarded as disordered or amorphous. If the number of grains is increased, i.e. the size of the grains is decreased, the degree of grain boundaries or disordered material in the structure is also increased. In a nanocrystalline material, the grains are very small and the material can be regarded as a composite material with many small crystals in a disordered (amorphous) matrix.

The composite materials of crystalline metal in an amorphous matrix have been produced by subjecting alloys, which can form amorphous metal by rapid cooling, to cooling from melt in accordance with a controlled time-temperature curve in such a manner that a growth of crystals has been allowed before the material has been cooled to such an extent that continued crystal growth has been stopped. U.S. Pat. No. 7,244,321 describes such a method, where a further element has been added to the alloy system so as to function as a growth promoter for the crystallization. It is also known to start from an object of an amorphous alloy and heat-treat the object in accordance with a controlled time-temperature curve causing a growth of crystals in the material and thereafter rapidly cool the object again. Production of composite materials of nanocrystalline particles in an amorphous matrix is for instance described in an article by Inoue et al: "Synthesis of High Strength Bulk Nanocrystalline Alloys Containing Remaining Amorphous Phase", Journal of Metastable and Nanocrystalline Materials, Vol. 1, (1999), pp 1-8.

In the production of three-dimensional bodies, for instance constructional details which can have a considerable material thickness and varying geometrical shape, it is not possible to achieve a sufficiently well-defined cooling speed in all parts of the body with these known methods. Owing to the fact that the size and rate of growth of the crystals depend on the temperature and the time period during which the temperature in question acts on the material, these methods will not give a body with controlled material properties.

BRIEF SUMMARY OF THE INVENTION

An object of the present invention is to achieve a method of producing, from metal alloys, three-dimensional bodies which wholly or partly consist of a composite of crystalline or nanocrystalline metal particles in a matrix of amorphous metal, where the above-mentioned problem is considerably reduced. A further object is to provide a method that allows production of three-dimensional bodies which for selected parts consist of a composite of crystalline or nanocrystalline metal particles in an amorphous matrix. A further object of the invention is to achieve a method of producing three-dimensional bodies consisting of gradient material, i.e. the structure of the material with respect to the size and amount of the crystalline metal particles can be varied in different parts of the body but also the chemical composition of the used alloy can be varied between different parts of the body.

This is achieved by means of a method defined in the appended claims.

A freeforming technique of the type described in WO 2008/039134 can be used in connection with the method according to the invention, but with the difference that the process is controlled so as to achieve a desired content of composite metal in the produced body. A metal powder layer is applied onto a heat-conducting base and limited areas of the layer are melted successively by means of a radiation gun and cooled so that the area can be made to solidify into amorphous metal. According to the invention, the radiation gun is regulated in connection with the melting of one or several areas of the layer in such a manner that the melted area is cooled in accordance with a stipulated time-temperature curve in order to form a composite of crystalline or nanocrystalline metal particles in a matrix of amorphous metal. The method is repeated until a continuous layer which contains composite metal to a desired extent is formed. A new powder layer is applied and the method is repeated, the new layer being fused to the underlying layer for successive construction of the three-dimensional body.

According to an alternative procedure, the metal powder layer is melted area by area by means of the radiation gun and the area is rapidly cooled so that it solidifies into amorphous metal, i.e. at the beginning one proceeds in the same manner as described in WO 2008/039134. A limited area of the formed amorphous metal is reheated by means of the radiation gun to a temperature above the glass transition temperature (Tg) of the material and the radiation gun is regulated in such a manner that the limited area is heat-treated in accordance with a stipulated time-temperature curve in order to transform the amorphous metal into a composite of crystalline or nanocrystalline metal particles in a matrix of amorphous metal. The heat treatment is repeated successively on new limited areas until composite metal is formed to the desired extent in the layer in question. A new powder layer is then applied and the method is repeated, the new layer being fused to the underlying layer for successive construction of the three-dimensional body.

A suitable time-temperature curve is established by means of TTT-diagrams (Time Temperature Transformation) and CCT-diagrams (Continuous Cooling Transformation). The diagrams comprise a crystallization curve, a so-called nose, which shows the temperature and the time at which crystallization commences in the amorphous alloy in the supercooled state. These diagrams are discussed further in the following in connection with FIG. 1. In order to form a completely amorphous alloy, the cooling curve may not cross the crystallization curve. This applies correspondingly in connection with welding of amorphous alloys. Examples of time-temperature courses that can result in crystallization are for instance given in the article Y. Yokoyama et al: "Electron-beam welding of $Zr_{50}Cu_{30}Ni_{10}Al_{10}$ bulk glassy alloys", Materials Science and Engineering A 375-377 (2004) 422-426. Discussions about time-temperature courses for the formation of amorphous or crystalline structure can also be found in Y. Kawamura: "Liquid phase and supercooled liquid phase welding of bulk metallic glasses", Materials Science and Engineering A375-377 (2004) 112-119.

The radiation gun is controlled so that the contours of the continuous layer of composite metal that is formed correspond to a cross-section through the three-dimensional body. The body is built up layer by layer according to stacked cross-sections.

Instead of casting and melting all the material at the same time, small limited areas of the powder layer are melted at a time. This can take place continuously by moving the beam with a certain speed or intermittently by melting point-shaped areas and thereafter turning of the beam and moving the beam to another area of the powder layer. A small volume of melted alloy is easy to cool and the desired time-temperature courses can be achieved for the entire melted volume. The size of the limited area and the thickness of the powder layer may vary depending on the critical cooling speed for the alloy in question. Typically, the limited area can have a size from 1 $mm^2$ to 200 $mm^2$ and the powder layer can have a thickness from 0.1 mm to 5 mm.

The radiation gun is regulated by changing the power of the beam and/or by changing the dwell time of the beam in each point. In connection with continuous melting, the dwell time in each point is given by the moving speed of the beam. Furthermore, the focusing of the beam can be changed, i.e. the size of the point or the width of the strip that is being melted. A high power of the beam as well as a long dwell time/low moving speed for the beam will give lower cooling speed, i.e. the degree of crystallinity can increase. By regulating the beam in this manner, areas which are completely amorphous, completely crystalline/nanocrystalline or have a mixture of these structures can be produced for each powder layer.

Three-dimensional bodies of gradient material can be produced by the method. Different parts of the body can be made completely amorphous, completely nanocrystalline, completely crystalline or consist of composites of these structures. Also the chemical composition can be varied within the body by varying the composition of the added powder layers. It is previously known that amorphous materials with different chemical composition can be welded together by electron beam welding and that an amorphous structure can be welded together with a crystalline structure. See for instance S. Kagao et al: "Electron beam welding of Zr-based bulk metallic glasses", Materials Science Engineering A 375-377 (2004) 312-316 and Y. Kawamura et al: Materials Transactions, Vol 42, No. 12, (2001) pp 2649-2651.

WO 2004/056509 discloses a method of avoiding stresses in the material when melting metal powder according to the freeforming technique, by not sweeping the radiation gun over the powder layer in regular lines from one side to the other but first melting selected areas of the powder layer according to an operating scheme and the then connecting these areas. A technique similar to the one in WO 2004/056509 is particularly suited for use in the present invention when amorphous alloys with high demands with respect to cooling speed are used. It will then be easier to control the time-temperature course in the melted area and conduct heat away through the worktable before it is time to melt an adjacent limited area.

The heat-conducting base may consist of a worktable but may also be a body of amorphous, crystalline or nanocrystalline metal which forms part of the completed three-dimensional body and to which composite metal is added according to the method.

The cooling of the melted limited area can take place by conducting heat away through the heat-conducting base as well as by making a gas, for instance helium, flow against the melted area. The heat-conducting base, for instance a worktable, consists of a material with high thermal conductivity and has a sufficient mass to serve as an effective heat sink which quickly absorbs the heat from the melted areas. The worktable may for instance consist of a thick plate of heat-conducting metal, for instance copper, aluminium or iron, or a ceramic with high thermal conductivity, for instance boron nitride. The heat-conducting base is preferably cooled by a refrigerant, for instance water. The worktable may for instance be provided with cooling ducts, through which the refrigerant is passed so that the heat absorbed in the heat sink/worktable continuously is conducted away. When a new part of composite metal is added to an existing metal body, the body can be surrounded by cooling coils and embedded in a powder with high thermal conductivity.

The metal powder distributed on the working area can be an amorphous powder or a crystalline powder of an alloy that forms nanocrystalline or amorphous metal in connection with rapid controlled cooling. Examples of alloy systems that can be used are titanium-based, zirconium-based and copper-based alloys. Other examples are the iron-based and aluminium-based alloys exemplified in Leslie K. Kohler et al: "Spray Forming Iron Based Amorphous Metals", Document NSWCCD-61-TR-2003/09 from Naval Surface Warfare Center and in S. J. Spoon et al: "Glass formability of ferrous- and aluminium-based structural metallic alloys", Journal of Non-Crystalline Solids, Vol 317, No. 1, March 2003, pp. 1-9. Some examples of alloys which can form amorphous metal when being cooled rapidly are:

Ni—Nb—Sn
Co—Fe—Ta—B
Ca—Mg—Ag—Cu
Co—Fe—b—Si—Nb
Fe—Ga—(Cr,Mo)—(P,C,B)
Ti—Ni—Cu—Sn
Fe—Co—Ln—B
Co—(Al,Ga)—(P,B,Si)

Fe—B—Si—Nb
Ni—(Nb,Ta)—Zr—Ti
Ni—Zr—Ti—Sn—Si
Fe—Ga—(P,B)
Co—Ta—B
Ni—(Nb, Cr,Mo)—(P,B)
Fe—(Al,Ga)—(P,C,B,Si,Ge)
Zr—Ti—Cu—Ni—Al
Zr—(Ti,Nb,Pb)—Al-TM
Zr—Ti-TM-Be
Ti—Zr-TM
Zr—Al-TM
Mg-Ln-M
TM=transition metal
M=metal Further alloys of this type are stated in Inoue et al: "Stability and Icosahedral Transformation of Supercooled Liquid in Metal—Metal type Bulk Glassy Alloys" presented at the Materials Research Society, Boston, Mass., USA.

The radiation gun can be a high power laser, for instance a YAG laser, or electron beam.

BRIEF DESCRIPTION OF THE DRAWINGS

An embodiment of the invention will in the following be described in closer detail with reference the appended Figures. Equivalent components in the Figures have been given the same reference signs.

DETAILED DESCRIPTION OF THE PREFERRED EMBODIMENTS

Figure 1:
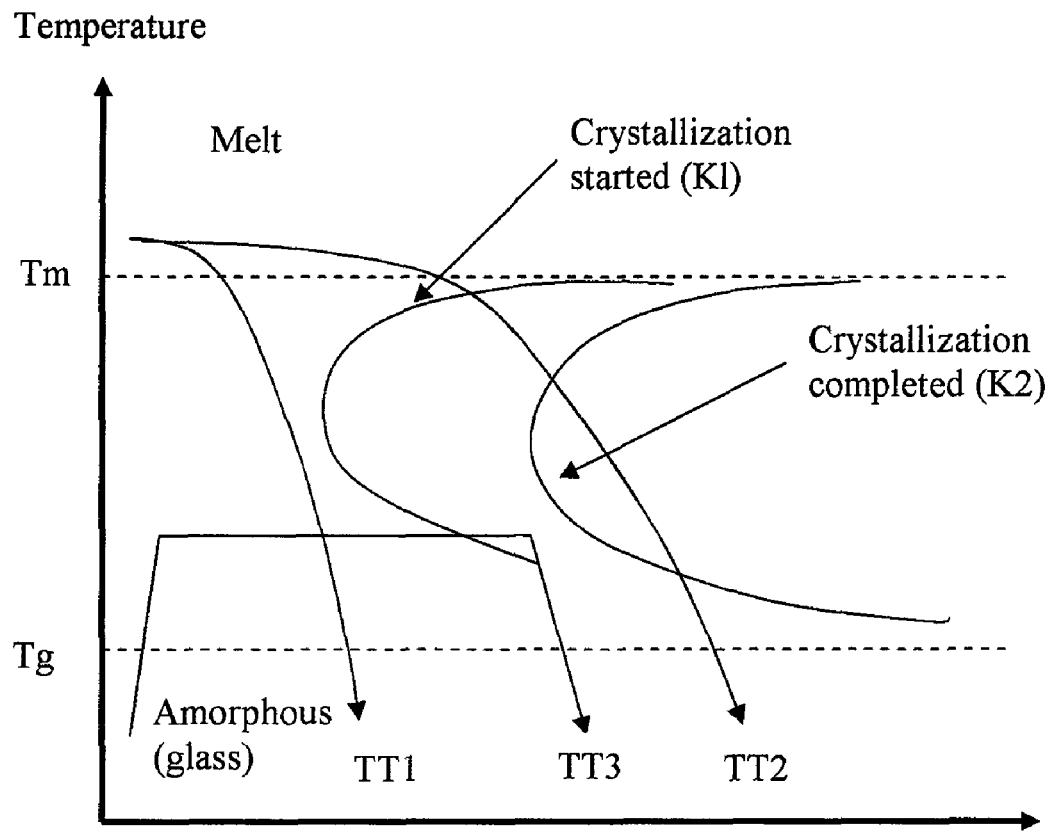
FIG. 1 schematically shows a TTT-diagram for an amorphous alloy.

FIG. 1 shows the principal for a TTT-diagram or a CCT-diagram for a contemplated alloy that can form amorphous metal when being rapidly cooled. Diagrams of this type can be used as a basis for determining suitable time-temperature curves according to the invention. Tg designates the glass transition temperature of the alloy and Tm the melting temperature thereof. The curves designated K1 and K2 indicate incipient crystallization and full crystallinity, respectively. In the temperature area Tg-Tm and the time area to the left of the nose of the crystallization curve K1, the alloy can exist in supercooled state, which is utilized in order to make an amorphous metal. TT1 and TT2 designate time-temperature curves (cooling curves) when cooling from melt. TT3 designates a time temperature curve when heat-treating an amorphous alloy in order to achieve a partial crystallization. A TTT-diagram shows the crystallization curve when the crystallization occurs as the alloy is kept at a constant temperature above Tg. A CCT-diagram shows the crystallization curve when the cristallization occurs when cooling from melt. When cooling from melt, the crystallization curve will get a somewhat different appearance. Inter alia, the curve is usually offset towards larger times and higher temperatures as compared to the corresponding degree of transformation in a TTT-diagram. The position of the crystallization curve can also be affected by changed nucleation properties. For alloys having lower demands with respect to cooling speed, the crystallization curve is offset further to the right along the time scale in the diagrams. TT1 and TT2 designate contemplated time-temperature curves when cooling from melt. Crystallization occurs when the time-temperature curve crosses the crystallization curve K1. In the illustrated example, TT1 would result in an amorphous structure for the alloy, whereas TT2 would give a completely crystalline structure. A partially crystalline structure (composite metal) can be achieved when the time-temperature curve runs in such a manner that the course does not give the entire body time to be crystalline, i.e. the course crosses the curve K1 but not the curve K2. TT3 shows a contemplated time-temperature curve when heat-treating an amorphous alloy in order to achieve a partial crystallisation.

Whether or not nanocrystalline or crystalline particles are formed in the amorphous matrix in connection with the treatment depends among other things on how the material in question crystallizes. Generally, the crystallization can be divided into a nucleation phase and a crystal growth phase. The formation of a nanocrystalline structure is promoted if the rate of nucleation is high at the same time as the rate of growth of the formed crystals is low. For amorphous metals, the rate of nucleation as well as the rate of crystal growth depend strongly on the temperature and the composition. Crystal growth is the largest close to the melting temperature when the diffusion of material to the crystal is high. However, the driving force for nucleation is the largest at a considerably lower temperature. In order to obtain a composite material with nanocrystalline particles in an amorphous matrix, the heat treatment temperature or the cooling curve is to be chosen so that the quotient between the rate of nucleation and the rate of crystal growth will be as large as possible during the major part of the lapse of time.

Figure 2:
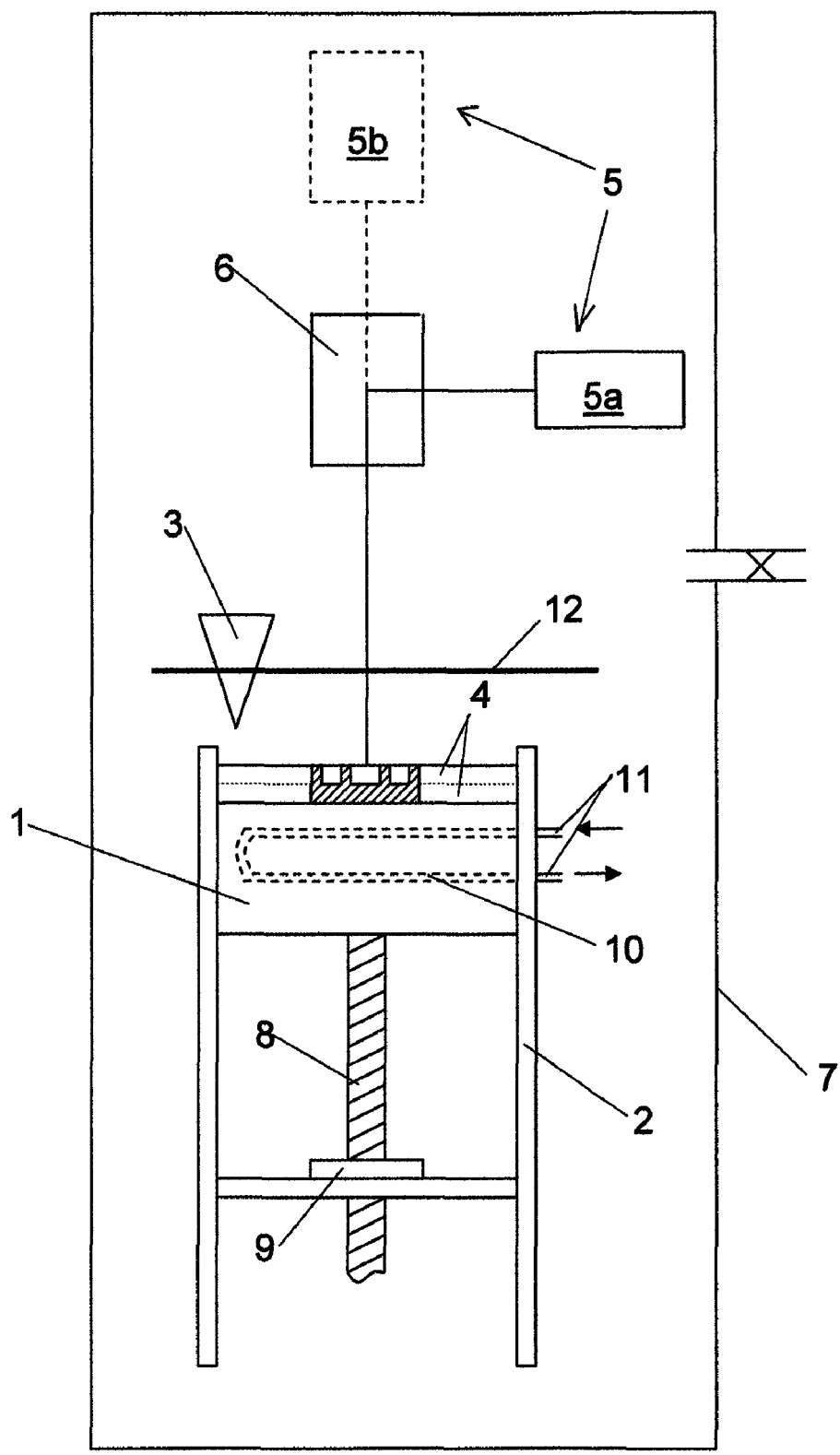
FIG. 2 is a schematic section through a device that can be used for producing objects of composite metal according to the inventive method.

FIG. 2 illustrates a device comprising a worktable 1, which is vertically adjustable and arranged in a case or a framework 2. The vertical adjustment of the worktable 1 can take place in many different ways and consists of a screw 8 and a nut 9 in the illustrated embodiment. A powder dispenser 3 is movable back and fourth across the worktable for applying powder layers 4. Furthermore, the device comprises a radiation gun 5 in the form of a laser 5a or an electron beam 5b and associated control means 6 for directing the laser beam/electron beam to selected positions on the powder layer. A control computer (not shown) regulates the worktable, the powder dispenser, the radiation gun and its control means. The control computer also contains information on the shape of the three-dimensional body to be produced (3-D drawing) and, thus, the contours of the cross-section represented by each powder layer. The entire device or parts thereof are enclosed in a casing 7 so that an inert atmosphere, or vacuum in case of electron beam melting, can be maintained during the melting process.

The worktable 1 may for instance consist of a thick plate of a material with high thermal conductivity, as mentioned above. Cooling ducts 10 are arranged in the worktable so that it can be passed by a refrigerant. Connections 11 are arranged for supply and discharge of the refrigerant. The refrigerant may for instance be water.

In the illustrated embodiment, the powder dispenser 3 is a funnel-shaped container which is slideable on guides 12 across the worktable. Powder is dispensed from the lower edge of the container while passing over the worktable, and a scraper or another levelling device (not shown) distributes the powder evenly over the working area.

The radiation gun 5 may consist of a high power laser 5a, for instance a YAG laser, and the control means 6 may consist of mirrors in the same way as shown in U.S. Pat. No. 4,863,538. The radiation gun 5 may also consist of an electron beam 5b in the same way as shown in WO 2004/056509, in which case the control means 6 consists of deflecting coils.

The casing 7 is used to enclose the parts of the apparatus that are subjected to vacuum when melting is done by means of electron beam, or the parts of the apparatus that are subjected to inert gas atmosphere, for instance argon, in connection with laser melting.

The method according to the invention will in the following be exemplified with the use of a device as described above. The method is exemplified with the use of a laser, but an electron beam can be used correspondingly.

A thin powder layer 4 is spread out on the worktable 1 by means of the powder dispenser 3. The control computer directs, by means of the control means 6, the laser to a selected limited area (point) on the layer that is to be melted. A laser pulse is activated and melts the limited area. Preferably, the entire thickness of the powder layer is melted on the limited area so as to be fused to the worktable 1. The heat transfer to the cooled worktable will thereby be optimal.

The power of the beam and/or the dwell time of the beam on the limited area is regulated in order to achieve the desired cooling speed and thereby a desired time-temperature curve. In connection with a continuous melting of a string, the dwell time is given by the moving speed of the beam.

Subsequently, the control computer directs the laser to another limited area and the melting process is repeated. The radiation gun is regulated to other values for power and/or dwell time if other material properties are to be achieved in the new limited area of the powder layer. This method is repeated until the limited areas have been fused into a continuous layer.

According to an alternative method, a completely amorphous layer is produced at first by using a cooling speed that gives amorphous phase. Consequently, one proceeds initially in the same way as in WO 2008/039134. The radiation gun is then again directed over the produced amorphous layer and a limited area is heated to a temperature above the glass transition temperature Tg of the alloy. The power and the dwell time of the beam is regulated so that the area is heat-treated in accordance with a selected time-temperature curve in order to transform the amorphous material to a composite of crystalline or nanocrystalline metal particles in an amorphous matrix. The method is repeated on all areas of the layer where the amorphous structure is to be transformed and the layer is given the desired material properties in selected parts.

Subsequently, the worktable 1 is lowered, a new thin powder layer 4 is applied by means of the powder dispenser 3 and new limited areas are melted with laser pulses, whereby the area is fused to the underlying layer. In this way, the three-dimensional body is built up layer by layer, each layer being melted in accordance with the contours corresponding to the cross-section in question of the three-dimensional body. With the body fused to the worktable, the body must be cut loose when completed. The first layers produced are therefore excess material and do not need to constitute an actual cross-section of the completed body, but can be formed more freely so as to ensure good heat transfer to the worktable.

The completed three-dimensional body can consequently have different structures in different parts of the body and consist of amorphous and crystalline parts and composites of crystalline or nanocrystalline metal particles in an amorphous matrix. The chemical composition of the body can also be varied along the body by using different powders for different layers. Different powders and powder compositions may be stratified in the powder dispenser 3 before the production is started.

In the normal case, refrigerant is passed through the cooling ducts 10 in the worktable and continuously removes the heat that is absorbed in the heat sink. In some cases, the function of the worktable as a heat sink can be sufficient for rapidly cooling the melt into nano metal or amorphous metal without the table being passed by a refrigerant.

Figure 3:
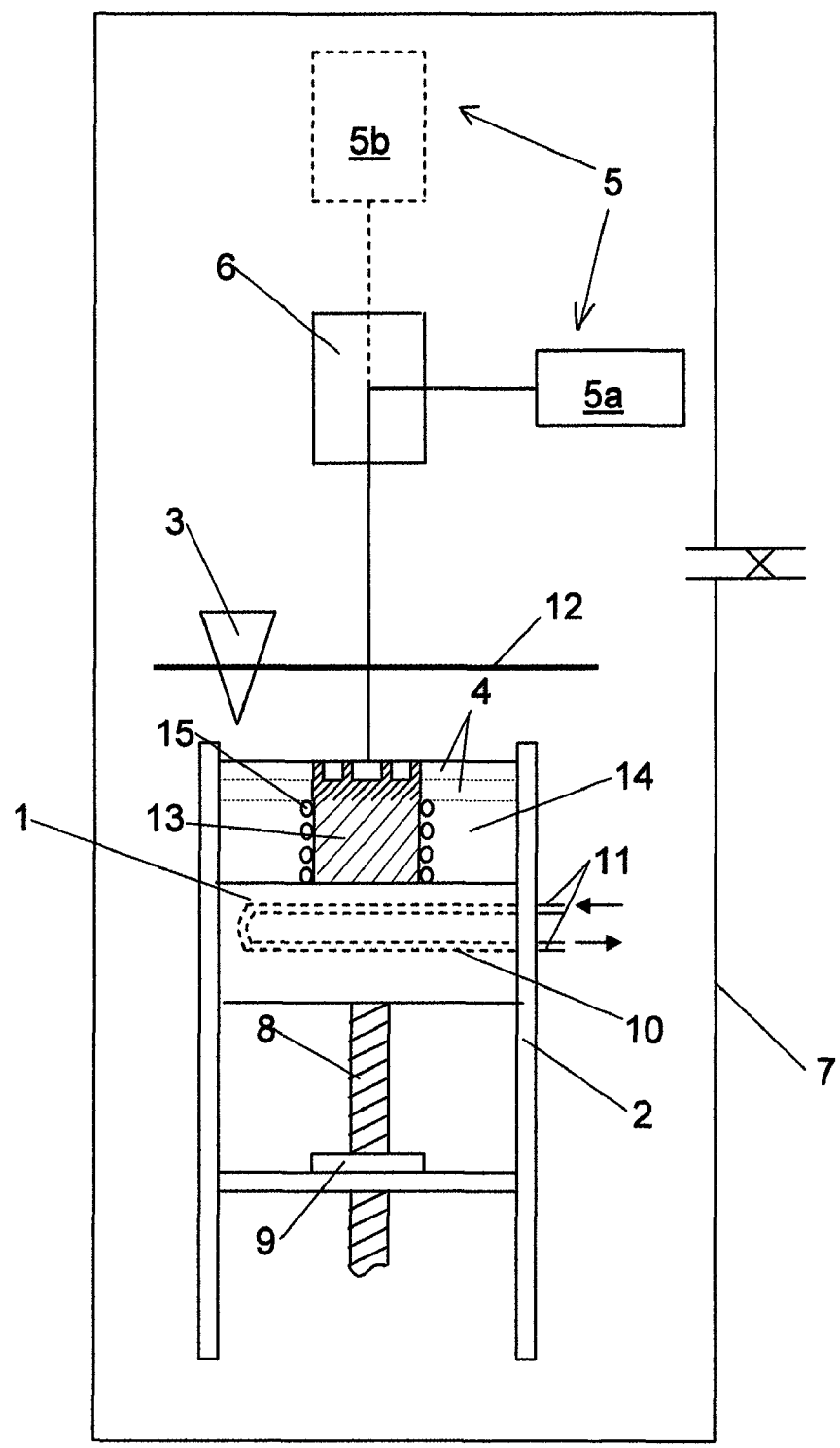
FIG. 3 is a schematic section through a device for adding composite metal to a body according to the inventive method.

FIG. 3 schematically illustrates how composite metal can be added to a body 13 of amorphous or crystalline metal. The body 13 is placed on the worktable 1 and embedded in a powder 14 with high thermal conductivity. In addition, the body is surrounded by cooling coils 15 which are passed by a refrigerant. The worktable 1 as well as the body 13 can consequently be cooled by a refrigerant. The procedure is substantially the same as described above. A metal powder layer 4 is applied over the body 13 and the layer is successively fused to the body area by area while cooling. In this case, also the first layer corresponds to a cross-section of the completed body.

EXAMPLE 1

A circular plate with a diameter of 20 mm and a thickness of 2 mm of the alloy $Zr_{52.5}Ti_5Cu_{17.9}Ni_{14.6}Al_{10}$ was attached to a much larger metal plate so as to ensure a good heat transfer between the plates. The plates were placed in vacuum and a thin layer of $Zr_{55}Cu_{30}Al_{10}Ni_5$ was spread onto the circulate plate. The material was then melted with an electron beam. The beam was focused and the acceleration voltage was 60 kV. The moving speed and power (current strength) of the beam were varied during the melting, i.e. different time-temperature courses for the cooling of the melt were created. A new thin powder layer was supplied and the process was repeated so that the powder layer was fused to the underlying layer. After the trial, it could be established by means of a DSC (Differential Scanning calorimetry) and X-ray diffraction that the material did not only contain amorphous structures but also crystalline structures and mixtures of the two, and that gradients with respect to chemical composition also had been obtained.

The invention claimed is:

1. A method of producing three-dimensional bodies which wholly or for selected parts consist of a composite of crystalline or nanocrystalline metal particles in a matrix of amorphous metal, the method comprising the applying of a metal powder layer (4) onto a heat-conducting base (1, 13), successive melting of limited areas of the layer by means of a radiation gun (5) and cooling of the melted areas so that they can be made to solidify into amorphous metal, characterized in that the radiation gun, in connection with the melting of one or several limited areas of the layer, is regulated so that the melted area is cooled in accordance with a stipulated time-temperature curve in order to form a composite of crystalline or nanocrystalline metal particles in a matrix of amorphous metal; that the method is repeated until a continuous layer is formed, which contains composite metal to a desired extent; and that a new powder layer (4) is applied and the method repeated, the new layer being fused to the underlying layer for successive construction of the three-dimensional body.

2. A method of producing three-dimensional bodies which wholly or for selected parts consist of a composite of crystalline or nanocrystalline metal particles in a matrix of amorphous metal, the method comprising the applying of a metal powder layer (4) onto a heat-conducting base (1, 13), successive melting of the metal powder layer by means of a radiation gun (5) and cooling so that it solidifies into amorphous metal, characterized in that a limited area of the formed amorphous metal is reheated by means of the radiation gun to a temperature above the glass transition temperature (Tg) of the material and that the radiation gun is regulated so that the limited area is heat-treated in accordance with a stipulated time-temperature curve in order to transfer the amorphous metal into a composite of crystalline or nanocrystalline metal particles in a matrix of amorphous metal;

that the heat treatment is successively repeated on new limited areas until composite metal is formed to a desired extent in the layer in question; and that a new powder layer (4) is applied and the method repeated, the new layer being fused to the underlying layer for successive construction of the three-dimensional body.

3. A method according to claim 1, characterized in that the radiation gun is regulated by varying the power and/or the dwell time in each point on the layer.

4. A method according to claim 1, characterized in that a powder with another composition than in the other layers is used in one or several powder layers (4).

5. A method according to claim 1, characterized in that the heat-conducting base is a body (13) of amorphous metal, crystalline metal or composite metal, which forms part of the completed three-dimensional body and to which part composite metal is added.

6. A method according to claim 1, characterized in that the heat-conducting base is a worktable (1).

7. A method according to claim 1, characterized in that the heat-conducting base (1, 13) consists of a material with high thermal conductivity and serves as a heat sink for rapid cooling of the melted area in the powder layer.

8. A method according to claim 1, characterized in that the heat-conducting base (1, 13) is cooled by a refrigerant.

* * * * *